Oct. 30, 1962     I. L. JOY     3,061,735
ELECTRICAL GENERATOR REGULATING SYSTEMS
Filed Jan. 31, 1958     2 Sheets-Sheet 1

Inventor
Ivan L. Joy
By Mann, Brown & McWilliams
Attorneys

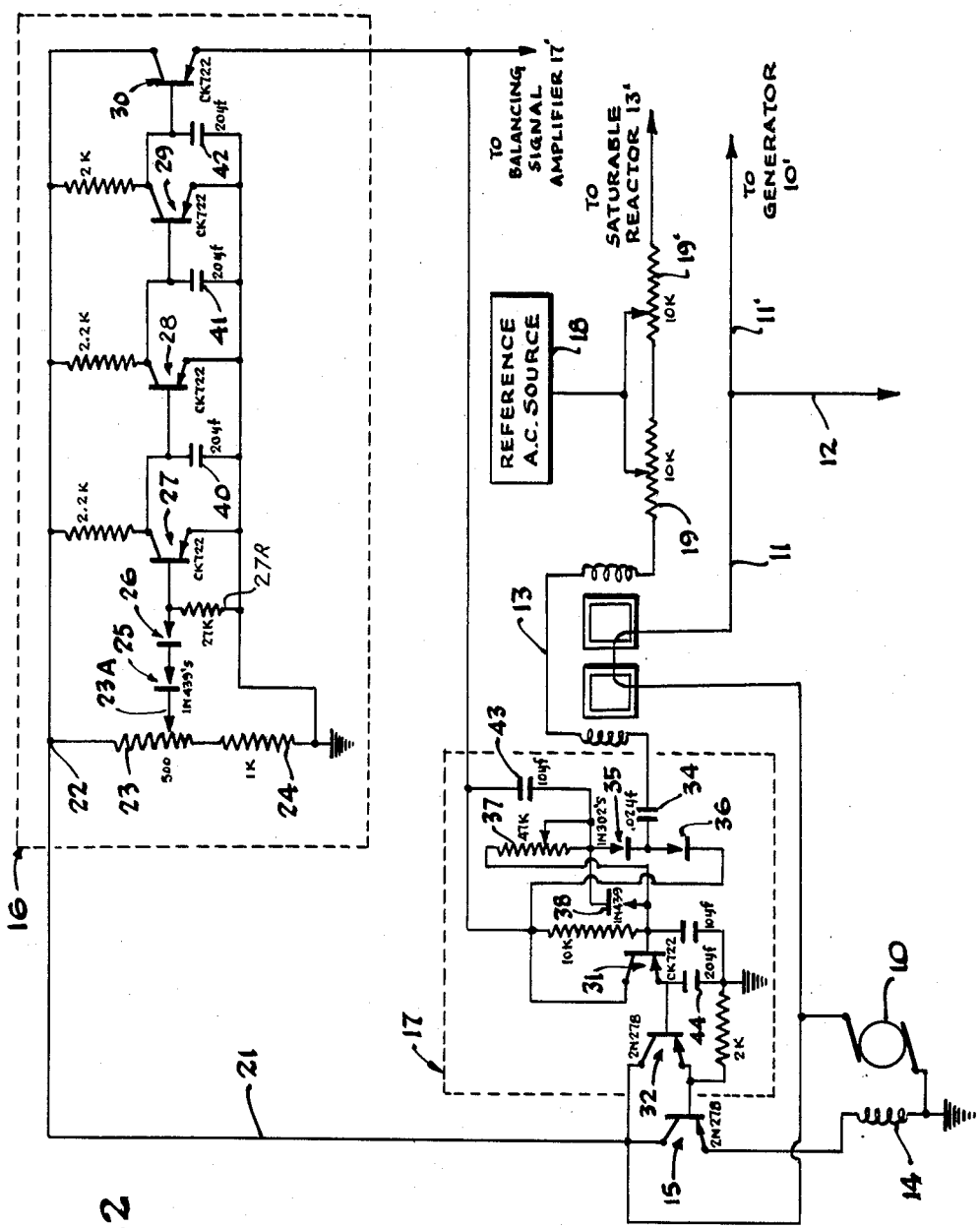

United States Patent Office 3,061,735
Patented Oct. 30, 1962

3,061,735
ELECTRICAL GENERATOR REGULATING
SYSTEMS
Ivan L. Joy, 1616 W. Dudley Road, Topeka, Kans.
Filed Jan. 31, 1958, Ser. No. 712,559
3 Claims. (Cl. 307—57)

This invention relates to regulating systems for electrical generators and, more particularly, is concerned with parallel-connected generator arrangements wherein voltage regulation and current balancing are important.

The present day contact-type and vibrating-reed type regulators are of limited accuracy and frequently encounter operating difficulties from such causes as corrosion and burning of contact points. In addition, unusually critical mechanical adjustments are required if any degree of accuracy is desired. In any event, as these mechanical regulators wear and age, it becomes practically impossible to maintain current balance for a plurality of parallel-connected generators. For example, a bus bar having a resistance of 0.001 ohm and fed from a plurality of generators, the output of one of which was 0.1 volt lower than the others, would experience a load variation of 100 amps.

The principal object of the present invention is to provide a regulating system employing transistors for maintaining voltage regulation and current balancing for parallel-connected generators.

The voltage-regulation system of the present invention is capable of controlling output voltage from "no load" to "full load" with a variation of less than 0.001 volt on a 24-volt system.

Current-balancing variations obtainable with the best mechanical regulators are reduced by a factor of 1,000 by the present invention.

Other objects and advantages will become apparent during the course of the following description.

In the accompanying drawings forming a part of this specification and in which like numerals are employed to designate like parts throughout the same;

FIG. 2 is a detailed wiring diagram of portions of the circuit of FIG. 1; and

Figure 3:
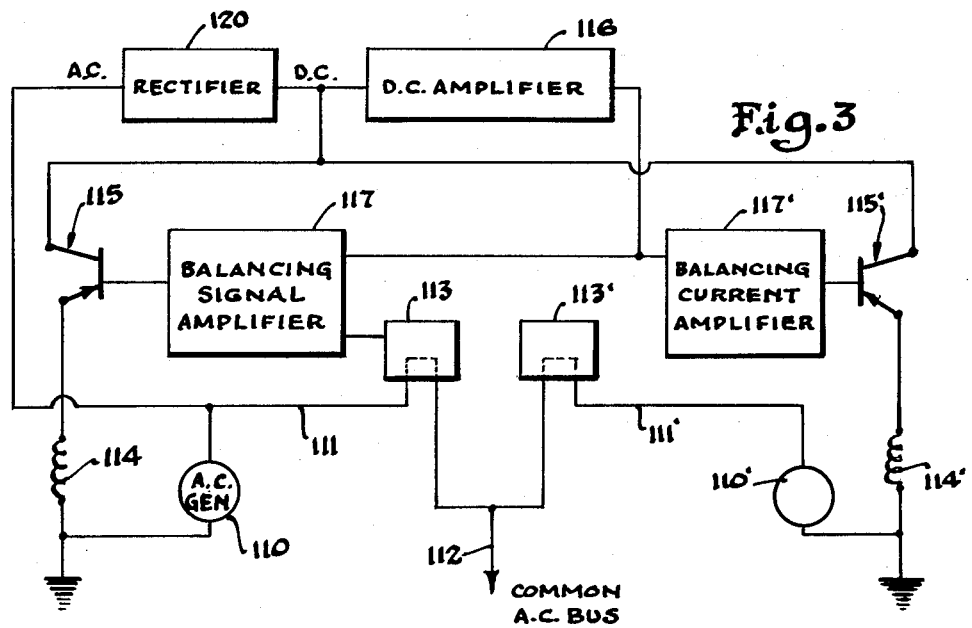
FIG. 3 is a generalized circuit diagram of the invention as applied to parallel-connected A.C. generators.

For purposes of disclosure the invention is described in connection with parallel-connected electrical generators of the type having a shunt field circuit for regulating the output voltage thereof. A system for D.C. generators 10 and 10' is shown in FIG. 1, while a system for A.C. generators 110 and 110' is shown in FIG. 3.

Figure 1:
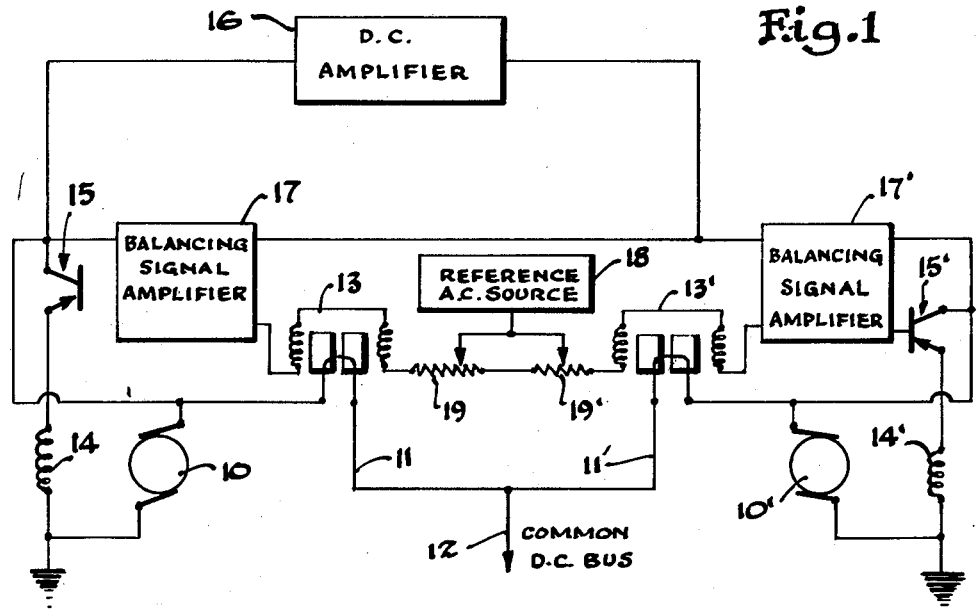
FIG. 1 is a generalized circuit diagram of the invention as applied to parallel-connected D.C. generators.

In the case of the D.C. system of FIG. 1, the generators are connected through suitable supply conductors 11 and 11' to a common D.C. bus 12 (the voltage of which may be, for example, 24 volts), with the supply conductors being passed through and controlling the impedance of saturable reactors 13 and 13'. Each generator is shown as including a shunt field 14 in series-connection with the emitter and collector elements of a current-controlling transistor 15, and facilities are provided for conditioning the base of the current-controlling transistor to variably adjust the current in the shunt fields and thereby to control the output voltage of the generators.

Facilities are provided for maintaining voltage regulation on the bus 12 and for maintaining exact current balances in the various supply conductors 11 of the generators. For the voltage regulation there is provided a D.C. transistor amplifier 16 that preferably includes Zener diodes for establishing reference voltages, as is explained later in connection with FIG. 2. The amplifier 16 senses magnitude variations from a predetermined norm (24 volts) of the bus voltage and supplies signals through a plurality of balancing-signal amplifiers 17 to simultaneously condition the bases of the various current-controlling transistors 15 to regulate the currents in the shunt fields 14 and eliminate any such variations in the bus voltage.

The current-balancing facilities include a reference signal A.C. source 18, which may comprise a 10 kc. oscillator having a constant amplitude output on the order of 50 volts, and variably adjustable resistors 19 through which the reference signal is supplied to the saturable reactors 13 and thence to the balancing-signal amplifier 17 for conditioning the bases of the various current-controlling transistors in accordance with the degree of balance or unbalance of the supply-conductor currents of the various generators.

A comparable control system for use with a plurality of A.C. generators is shown as including a similar D.C. amplifier 116 and balancing-signal amplifiers 117 again feeding current-controlling transistors 115 with the transistors being connected in series with the shunt fields 114 of the generator. In the case of the A.C. system, any suitable current-sensing device 113 may be employed in lieu of the saturable reactors and no refeernce signal source is required inasmuch as this is, of course, supplied from the current-sensing devices which are linked with the suppling conductors 111 that feed a common A.C. bus 112. In the A.C. system, there is included a reectifier 120 between the bus and the D.C. amplifier 116 for sensing the magnitude variations of the bus voltage, converting them to D.C., and presenting them to the amplifier 116.

The detailed circuit arrangement for the D.C. amplifier 16 of FIG. 1 and for one of the balancing-signal amplifiers 17 of FIG. 1 is shown in FIG. 3, wherein 21 represents a conductor that is connected between the D.C. amplifier 16 and hte D.C. bus to provide true bus voltage at the point 22. In the particular regulator arrangement disclosed, the voltage at point 22 is 24 volts; and a resistance network comprising potentiometer 23 and resistance 24 determine the regulating point. In the illustrated arrangement, two Zener reference diodes (1N 439's) 25 and 26 are connected in series to the potentiometer arm 23A, with the arm adjusted at 18 volts relative to ground. The diodes 25 and 26 thus serve as a reference for the transistorized D.C. amplifier, the first stage of which includes a transistor 27, the base of which is held toward ground potential by a resistor 27R in the absence of a signal from the diodes 25 and 26.

For convenience the remainder of the circuitry is described in connection with tracing a typical amplifying and control function in accordance with the present invention. It will be assumed that the voltage at point 22 tends to increase to 24.1 volts. This 0.1 volt increase applies current at the base of transistor 27 to drive this transistor toward a more saturated condition and thereby drive the voltage at the collector element toward ground. Thus, transistor stage 27 amplifies and inverts the voltage change at point 22 and applies it to transistor 28 of the next stage to drive it toward a cutoff condition and produce a voltage increase at its collector element. This voltage increase is then applied to the base of transistor 29 of the third stage to drive it toward a more saturated condition and produce an amplified negative voltage change at the collector of transistor 29. Transistor stage 30 of the D.C. amplifier and stages 31 and 32 of the balancing-signal amplifier are all connected as emitter followers so that the currents therein do not change phase and, thus, a decrease developed at the collector of transistor 29 due to an increase in bus voltage at point 22 is presented to the base of current-controlling transistor 15 as a decrease and causes the emitter of transistor 15 to controllably decrease the current through the shunt field and thereby achieve the desired voltage regulation. In an analogous manner a decrease in bus voltage at point 22 will appear as an increase at the base of transistor 15 an cause the emitter thereof to controllably increase the current through the shunt field circuit.

It will be understood that where the voltage-regulation system of the invention is applied to a plurality of parallel-connected generators, the current-controlling transistors for such generators will be controlled simultaneously from the D.C. amplifier.

In the current-balancing section of the system, the reference signal source 18 applies its constant-amplitude, 50-volt, 10 kc. output through parallel-connected resistors 19, 19′, thence through saturable reactors 13, 13′ to each of the balancing-signal amplifiers of the system. The saturable reactors allow little or none of the oscillator output to pass therethrough when the current in the associated supply conductor is small; however, as this supply-conductor current increases, the reactance presented by the saturable reactor is lowered and more of the reference signal is supplied therethrough to the balancing-signal amplifier.

This balancing-signal amplifier includes an input condenser 34 for supplying the reference signal to a diode-doubler arrangement comprising diodes 35 and 36. The voltage developed by the diodes is supplied through an adjustable resistor 37 to the base of transistor 31 for driving this transistor toward a non-conducting state. Only minute voltage signals are required at the base of transistor 31 for maintaining the desired current balance, and the initial current-balance adjustment is made by variable resistor 37.

The balancing-signal amplifier preferably includes current-limiting facilities which, as shown at 38, may be a Zener diode having a rating of nine volts. Thus, when the voltage from the doubler diodes 35 and 36 increases, the base of transistor 31, through the Zener diode 38, is rapidly driven toward cutoff to controllably limit the current conduction through the emitter of current-controlling transistor 15 and, thus, in addition to balancing the supply-conductor currents, the invention provides for limiting the maximum current output of the generators. Current-limiting adjustments are provided by variable resistors 19.

For purposes of disclosure, the invention has been described in connection with a circuit arrangement using PNP-type transistors. Obviously, polarities and diode connections can be reversed to adapt the circuit for use with NPN-type transistors.

In setting up the circuit of the invention, a workable impedance relationship must be established between the saturable reactor 13 and resistors 19 and 37, and a workable dynamic range relationship must be established between the Zener diode 38 and transistor 31, as will be apparent to those skilled in the art.

By-pass condensers are provided, as indicated at 40, 41, 42, 43 and 44 to minimize oscillation in the amplifiers, and in some cases it may be desirable to connect a by-pass condenser between the base of transistor 15 and ground. The size of these condensers affects the recovery time of the regulating system and in situations where more rapid recovery times are desired, smaller-sized capacitors will be employed. In situations where temperature compensation is desired, a suitable thermistor element is connected between resistor 24 and ground for limiting positive drift and/or between point 22 and potentiometer 23 for limiting negative draft. Depending upon the accuracy of the regulation desired, transistor stages 28 and 29 can be eliminated or increased.

In the particular circuit arrangement disclosed herein, a voltage regulation of 0.0025 volt is maintained from "no load" to "full load" and the complete equipment weighs only about one tenth as much as an average mechanical regulator.

It should be understood that the description of the preferred form of the invention is for the purpose of complying with section 112, title 35, of the U.S. Code and that the claims should be construed as broadly prior art will permit.

I claim:
1. The combination with a plurality of parallel-connected D.C. generators each having a supply conductor feeding a common bus and each being of the type having a shunt field circuit variably controlling the output voltage thereof in accordance with current changes in such shunt field circuit; of an electrical control circuit for each generator and including a current-controlling transistor having base, emitter, and collector elements connected in series in the shunt field circuit of the associated generator, an A.C. reference signal source, electrical means for each generator in common connection to said source for supplying a balancing reference signal through the electrical control circuit of such generator to the base element of the current-controlling transistor thereof for conditioning said transistor to variably adjust the current therethrough, said electrical means including a variable impedance responsive to supply-conductor current of the associated generator for regulating the magnitude of the reference signal supplied therethrough, and a D.C. amplifier responsive to magnitude variations from a predetermined norm of the voltage on said bus and in common connection to each of said electrical control circuits for conditioning the current-controlling transistor thereof to variably adjust the shunt field currents in a direction that compensates for such variations.

2. The combination with a plurality of parallel-connected D.C. generators each having a supply conductor feeding a common bus and each being of the type having a shunt field circuit variably controlling the output voltage thereof in accordance with current changes in such shunt field circuit; of an electrical control circuit for each generator and including a current-controlling transistor having base, emitter, and collector elements with said emitter and collector elements connected in series in the shunt field circuit of the associated generator, an A.C. reference signal source, and electrical means for each generator in common connection to said source for supplying a balancing reference signal through the electrical control circuit of such generator to the base element of the current-controlling transistor thereof for conditioning said transistor to variably adjust the current therethrough, said electrical means including a variable impedance responsive to supply-conductor current of the associated generator for regulating the magnitude of the reference signal supplied therethrough.

3. The combination with a plurality of parallel connected generators each having a supply conductor feeding a common bus and each being of the type having a shunt field circuit variably controlling the output voltage thereof in accordance with current changes in such shunt field circuit; of current-balancing means for said generators and comprising, for each generator, a separate current-controlling transistor in series in the shunt field circuit thereof and a separate saturable reactor means for each generator and connected to respond to the current in the supply conductor of its generator and connected for supplying a signal to its said transistor proportional to such supply conductor current for conditioning said transistor to correspondingly control the shunt field current, and means connecting all of said saturable reactor means in predetermined balanced relation to each other for maintaining the supply conductor currents in said predetermined balanced relation.

References Cited in the file of this patent

UNITED STATES PATENTS

| | | |
|---|---|---|
| 1,661,841 | McDonald | Mar. 6, 1928 |
| 1,786,311 | McDonald | Dec. 23, 1930 |
| 2,809,301 | Short | Oct. 8, 1957 |
| 2,859,356 | King | Nov. 4, 1958 |
| 2,859,357 | Schmeling | Nov. 4, 1958 |
| 2,862,175 | Guyton et al. | Nov. 25, 1958 |